Patented Feb. 17, 1925.

1,526,627

UNITED STATES PATENT OFFICE.

JÜRGEN CALLSEN, OF ELBERFELD, GERMANY, ASSIGNOR TO FARBENFABRIKEN VORM. FRIEDR. BAYER AND CO., OF LEVERKUSEN, NEAR COLOGNE ON THE RHINE, GERMANY.

IODINE COMPOUND.

No Drawing.   Application filed April 17, 1924.   Serial No. 707,305.

*To all whom it may concern:*

Be it known that I, JÜRGEN CALLSEN, a citizen of Germany, residing at Elberfeld, in the State of Prussia, Germany, have invented new and useful Improvements in Iodine Compounds, of which the following is a specification.

I have found that the hitherto unknown iodides of symmetrical hexaalkyldiaminoisopropylalcohols having most probably the following general formula:

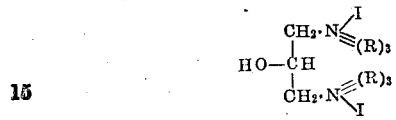

(R standing for an alkyl) have proved to be therapeutically valuable products. They can be employed for subcutaneous injections to provide the human body with iodine which is split off from these compounds.

The process for their production consists in either treating alpha-gamma-diiodohydrine with trialkylamines, adding an alkyliodide to alpha-gamma-di(dialkylamino)-beta-hydroxypropane or converting the alpha-gamma-di(trialkylammonium-chloride or bromide) of the beta-hydroxypropane into its iodide.

The new products are generally colorless crystals easily soluble in water with a neutral reaction.

In order to illustrate the new process more fully the following example is given, the parts being by weight:—

146 parts of symmetrical tetramethyldiaminoisopropanol are mixed with 600 parts of benzene and 284 parts of methyliodide ($CH_3$—I) are slowly added whilst cooling and stirring. An oil which crystallizes after some time separates. It is separated from the benzene and crystallized from hot alcohol. The symmetrical hexamethyldiaminoisopropylalcoholiodide forms white crystals easily soluble in water, soluble in alcohol and being almost insoluble in ether and benzene. It melts at about 270 to 275° C. with decomposition.

The tetramethyldiethyldiaminoisopropanoldiiodide melts at 194° C.

I claim:—

1. The herein described new iodine compounds of symmetrical hexaalkyldiaminoisopropylalcohols having most probably the formula:

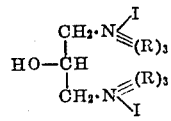

(R standing for an alkyl) being generally colorless crystals easily soluble in water with a neutral reaction and being therapeutically valuable compounds, substantially as described.

2. The herein described new iodine compound of symmetrical hexamethyldiaminoisopropylalcohol having most probably the formula:

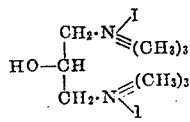

forming white crystals easily soluble in water, soluble in alcohol and almost insoluble in ether and benzene, melting at about 270–275° C. with decomposition and being a therapeutically valuable compound, substantially as described.

In testimony whereof I have hereunto set my hand.

JÜRGEN CALLSEN.